(12) United States Patent
Matityahu et al.

(10) Patent No.: US 8,902,735 B2
(45) Date of Patent: *Dec. 2, 2014

(54) GIGABITS ZERO-DELAY TAP AND METHODS THEREOF

(75) Inventors: Eldad Matityahu, Palo Alto, CA (US); Robert Shaw, Los Gatos, CA (US); Dennis Carpio, San Jose, CA (US); Ky Hong Le, San Jose, CA (US); Randy Fung, San Jose, CA (US)

(73) Assignee: Net Optics, Inc., Santa Clara, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 13/034,730

(22) Filed: Feb. 25, 2011

(65) Prior Publication Data

US 2011/0211446 A1    Sep. 1, 2011

Related U.S. Application Data

(60) Provisional application No. 61/308,981, filed on Feb. 28, 2010.

(51) Int. Cl.
*H04L 12/26* (2006.01)

(52) U.S. Cl.
CPC .............. *H04L 43/12* (2013.01); *H04L 43/026* (2013.01); *Y02B 60/33* (2013.01)
USPC .......................................... 370/225; 370/227

(58) Field of Classification Search
None
See application file for complete search history.

(56) References Cited

U.S. PATENT DOCUMENTS

| 4,802,161 A | 1/1989 | Byars et al. |
| 5,173,794 A | 12/1992 | Cheung et al. |
| 5,539,727 A | 7/1996 | Kramarczyk et al. |
| 5,550,802 A | 8/1996 | Worsley et al. |
| 5,648,965 A | 7/1997 | Thadani et al. |
| 5,696,859 A | 12/1997 | Onaka et al. |
| 5,710,846 A | 1/1998 | Wayman et al. |
| 5,774,453 A | 6/1998 | Fukano et al. |
| 5,781,318 A | 7/1998 | Tremblay |
| 5,825,775 A | 10/1998 | Chin et al. |
| 5,983,308 A | 11/1999 | Kerstein |

(Continued)

FOREIGN PATENT DOCUMENTS

| JP | 2001-197066 A | 7/2001 |
| JP | 2006-148686 A | 6/2006 |

(Continued)

OTHER PUBLICATIONS

"Final Office Action", U.S. Appl. No. 10/834,448, Mailing Date: Jun. 27, 2011.

(Continued)

*Primary Examiner* — Hassan Kizou
*Assistant Examiner* — Tejis Daya
(74) *Attorney, Agent, or Firm* — IPSG, P.C., Intellectual Property Law (57) ABSTRACT

A gigabits zero-delay arrangement for enabling continuous monitoring of data traversing through a network in a high-speed Ethernet environment is provided. The arrangement includes a high-speed network device configured for monitoring the data flowing through the network. The arrangement also includes a primary power source for providing a first power to circuitry of the gigabits zero-delay arrangement. The arrangement further includes a sensor controller configured for monitoring power flowing into the high-speed network device and for establishing an alternative communication link.

17 Claims, 9 Drawing Sheets

(56) References Cited

U.S. PATENT DOCUMENTS

| | | | |
|---|---|---|---|
| 6,041,037 A | 3/2000 | Nishio et al. | |
| 6,047,321 A | 4/2000 | Raab et al. | |
| 6,108,310 A | 8/2000 | Wilkinson et al. | |
| 6,167,025 A | 12/2000 | Hsing et al. | |
| 6,239,579 B1 * | 5/2001 | Dunn et al. | 320/121 |
| 6,272,136 B1 | 8/2001 | Lin et al. | |
| 6,366,557 B1 | 4/2002 | Hunter | |
| 6,424,627 B1 | 7/2002 | Sorhaug et al. | |
| 6,449,247 B1 | 9/2002 | Manzardo et al. | |
| 6,542,145 B1 | 4/2003 | Resisinger et al. | |
| 6,650,803 B1 | 11/2003 | Ramaswami et al. | |
| 6,658,565 B1 | 12/2003 | Gupta et al. | |
| 6,687,009 B2 | 2/2004 | Hui et al. | |
| 6,687,847 B1 | 2/2004 | Aguilera et al. | |
| 6,714,976 B1 | 3/2004 | Wilson et al. | |
| 6,798,740 B1 | 9/2004 | Senevirathne et al. | |
| 6,801,940 B1 | 10/2004 | Moran et al. | |
| 6,823,383 B2 | 11/2004 | MacBride | |
| 6,841,985 B1 | 1/2005 | Fetzer | |
| 6,850,706 B2 | 2/2005 | Jager et al. | |
| 6,882,654 B1 | 4/2005 | Nelson | |
| 6,898,630 B2 | 5/2005 | Ueno et al. | |
| 6,898,632 B2 | 5/2005 | Gordy et al. | |
| 6,925,052 B1 | 8/2005 | Reynolds et al. | |
| 6,944,437 B2 | 9/2005 | Yang et al. | |
| 6,975,209 B2 | 12/2005 | Gromov | |
| 7,027,437 B1 | 4/2006 | Merchant et al. | |
| 7,171,504 B2 | 1/2007 | Ishii | |
| 7,277,957 B2 | 10/2007 | Rowley et al. | |
| 7,308,705 B2 | 12/2007 | Gordy et al. | |
| 7,321,565 B2 | 1/2008 | Todd et al. | |
| 7,324,553 B1 | 1/2008 | Varier et al. | |
| 7,415,013 B1 | 8/2008 | Lo | |
| 7,430,354 B2 | 9/2008 | Williams | |
| 7,477,611 B2 | 1/2009 | Huff | |
| 7,486,624 B2 | 2/2009 | Shaw et al. | |
| 7,486,625 B2 | 2/2009 | Matityahu et al. | |
| 7,505,416 B2 | 3/2009 | Gordy et al. | |
| 7,616,587 B1 | 11/2009 | Lo et al. | |
| 7,627,029 B2 | 12/2009 | Ho et al. | |
| 7,760,859 B2 | 7/2010 | Matityahu et al. | |
| 7,773,529 B2 | 8/2010 | Matityahu et al. | |
| 2001/0040870 A1 | 11/2001 | Ohmori et al. | |
| 2002/0003592 A1 | 1/2002 | Hett et al. | |
| 2002/0026374 A1 | 2/2002 | Moneymaker et al. | |
| 2002/0032880 A1 | 3/2002 | Poletto et al. | |
| 2002/0073199 A1 | 6/2002 | Levine et al. | |
| 2002/0087710 A1 | 7/2002 | Aiken et al. | |
| 2002/0146016 A1 | 10/2002 | Liu et al. | |
| 2002/0176355 A1 | 11/2002 | Mimms et al. | |
| 2002/0180592 A1 | 12/2002 | Gromov | |
| 2003/0112760 A1 | 6/2003 | Puppa et al. | |
| 2003/0142666 A1 | 7/2003 | Bonney et al. | |
| 2003/0184386 A1 | 10/2003 | Varner et al. | |
| 2003/0215236 A1 | 11/2003 | Manifold | |
| 2004/0008675 A1 | 1/2004 | Basso et al. | |
| 2004/0023651 A1 | 2/2004 | Gollnick et al. | |
| 2004/0062556 A1 | 4/2004 | Kubo et al. | |
| 2004/0096227 A1 | 5/2004 | Bulow | |
| 2004/0109411 A1 | 6/2004 | Martin | |
| 2004/0120259 A1 | 6/2004 | Jones et al. | |
| 2004/0128380 A1 | 7/2004 | Chen et al. | |
| 2004/0190547 A1 | 9/2004 | Gordy et al. | |
| 2004/0202164 A1 | 10/2004 | Hooper et al. | |
| 2004/0215832 A1 | 10/2004 | Gordy et al. | |
| 2005/0005031 A1 | 1/2005 | Gordy et al. | |
| 2005/0060535 A1 | 3/2005 | Bartas | |
| 2005/0071711 A1 | 3/2005 | Shaw | |
| 2005/0108444 A1 | 5/2005 | Flauaus et al. | |
| 2005/0122910 A1 | 6/2005 | Parupudi et al. | |
| 2005/0129033 A1 | 6/2005 | Gordy et al. | |
| 2005/0132051 A1 | 6/2005 | Hill et al. | |
| 2005/0231367 A1 | 10/2005 | Bellantoni | |
| 2005/0257262 A1 | 11/2005 | Matityahu et al. | |
| 2005/0271065 A1 | 12/2005 | Gallatin et al. | |
| 2005/0278565 A1 | 12/2005 | Frattura et al. | |
| 2006/0083268 A1 | 4/2006 | Holaday et al. | |
| 2006/0083511 A1 | 4/2006 | Edmunds et al. | |
| 2006/0153092 A1 | 7/2006 | Matityahu et al. | |
| 2006/0200711 A1 | 9/2006 | Schondelmayer et al. | |
| 2006/0215566 A1 | 9/2006 | Walsh | |
| 2006/0233115 A1 | 10/2006 | Matityahu et al. | |
| 2006/0282529 A1 | 12/2006 | Nordin | |
| 2007/0002754 A1 | 1/2007 | Matityahu et al. | |
| 2007/0002769 A1 | 1/2007 | Matityahu et al. | |
| 2007/0064917 A1 * | 3/2007 | Matityahu et al. | 379/338 |
| 2007/0081549 A1 * | 4/2007 | Cicchetti et al. | 370/447 |
| 2007/0081553 A1 | 4/2007 | Cicchetti et al. | |
| 2007/0171966 A1 | 7/2007 | Light et al. | |
| 2007/0174492 A1 | 7/2007 | Light et al. | |
| 2007/0211682 A1 | 9/2007 | Kim et al. | |
| 2007/0213862 A1 | 9/2007 | Chang et al. | |
| 2008/0014879 A1 | 1/2008 | Light et al. | |
| 2008/0049627 A1 | 2/2008 | Nordin | |
| 2008/0168283 A1 * | 7/2008 | Penning | 713/310 |
| 2008/0214108 A1 | 9/2008 | Beigne et al. | |
| 2009/0040932 A1 | 2/2009 | Matityahu et al. | |
| 2009/0041051 A1 | 2/2009 | Matityahu et al. | |
| 2010/0146113 A1 | 6/2010 | Matityahu et al. | |
| 2010/0183298 A1 * | 7/2010 | Biegert et al. | 398/17 |
| 2010/0195538 A1 | 8/2010 | Merkey et al. | |
| 2010/0247068 A1 * | 9/2010 | Howarter et al. | 386/83 |

FOREIGN PATENT DOCUMENTS

| | | |
|---|---|---|
| KR | 10-2004-0058415 A | 7/2004 |
| WO | WO-02/19642 A1 | 3/2002 |
| WO | WO-2004/012163 A2 | 2/2004 |

OTHER PUBLICATIONS

"Non Final Office Action", U.S. Appl. No. 10/834,448, Mailing Date: Dec. 22, 2010.

"International Search Report", PCT Application No. PCT/US2011/026159, Mailing Date: Nov. 30, 2011.

"Written Opinion", PCT Application No. PCT/US2011/026159, Mailing Date: Nov. 30, 2011.

Belkin International, Inc., "Belkin Quick Installation Guide", N1 Vision Wireless Router, Belkin International, Inc., Compton, CA, Feb. 11, 2009, 3 pages total.

Belkin International, Inc., "Network Status Display", Belkin International, Inc., Compton, CA, 2007, 1 page total.

HP, et al., "Reduced Gigabit Media Independent Interface (RGMII)", Nov. 30, 2005, http://web.archive.org/web/20051113015000/http://www.hp.com/rnd/pdfs/RGMIIv2_0_final_hp.Pdf.

Wikipedia, "Field-programmable Gate Array", Jan. 21, 2005, http://web.archive.org/web/20050121193052/http://en.wi kiped ia.org/wiki/Field-programmable_gate_array.

Xilinx, "LogiCore OPB Ethernet Lite Media Access Controller", v1.01b, Mar. 3, 2006.

"Fast Ethernet Fiber-to-Fiber Converters", Canary Communications, Inc. 7 pages total, 2004.

"Sequence Reducer/ Sequence Mirror Operator's Guide", Peribit Networks, Inc. 13 pages total. 2001-2005.

"PeriScope Central Management System (CMS) 5.0 Administrator's Guide", Peribit Networks, Inc. 13 pages total. 2003-2004.

"VSS Coppertap Literature", VSS Monitoring Inc. 2 pages. 2003-2004.

"VSS Easy Install Guide", VSS Monitoring Inc. 8 pages total. 2003-2005.

"VSS Linksafe", VSS Monitoring Inc., 1 page. 2003-2005.

Anonymous, "100Base-TX/100BBase-FX Media Converters E-100BTX-FX-04 User's Guide", Transitions Networks, Minneapolis, MN, Copyright 1998-2000, 4 pages.

(56) References Cited

OTHER PUBLICATIONS

Gigamon Systems LLC, "GigaVUE—Product Brief", Gigamon Systems LLC, http://web.archive,org/web/20070815021951/www.gigamon.com/pdf/GigamonSystems-OnePageProductBrief.pdf, Aug. 15, 2007, 1 page.

"International Preliminary Report on Patentability", PCT Application No. PCT/US2011/026159, Mailing Date: Sep. 4, 2012.
"International Search Report", PCT Application No. PTC/US2012/030448; Mailing Date: Oct. 19, 2012.
"Written Opinion", PCT Application No. PCT/US2012/030448; Mailing Date: Oct. 19, 2012.

* cited by examiner

GIGABITS ZERO-DELAY TAP AND METHODS THEREOF

PRIORITY CLAIM

The present invention claims priority under 35 U.S.C. 119 (e) to a commonly owned provisionally filed patent application entitled "Gigabits Zero-Delay Tap and Methods Thereof," U.S. Application No. 61/308,981, filed on Feb. 28, 2010, by inventors Matityahu et al., all of which is incorporated herein by reference.

CROSS REFERENCE TO RELATED APPLICATIONS

The present invention is related to the following applications, all of which are incorporated herein by reference:

Commonly assigned application entitled "Zero-Interrupt Network Tap," filed on Apr. 28, 2004, by Matityahu et al. (application Ser. No. 10/834,448), all of which are incorporated herein by reference.

BACKGROUND OF THE INVENTION

In today modern society, telecommunication networks play a major role in providing global data and voice communication. Monitoring a network has become important to ensure reliable operation, fault detection, timely mitigation of potentially malicious activities and more. To ensure the vitality of the company, many companies have employed network taps in order to monitor the data traffic flowing through their networks.

Figure 1:
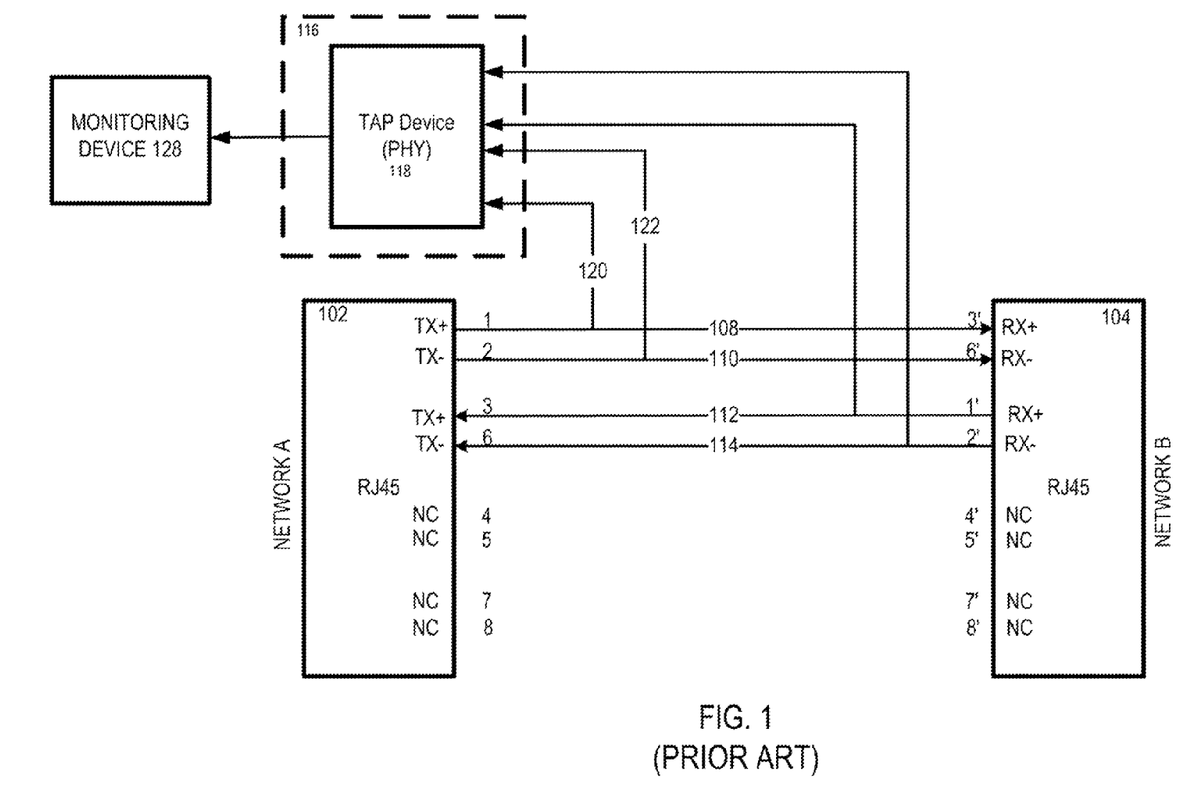
FIG. 1 shows a simple diagram of a network environment with a 10/100 megabytes tap.

To facilitate discussion, FIG. 1 shows a simple diagram of a network environment with a 10/100 megabytes tap. In a typical network environment, data traffic may be flowing between two network devices (Network A and Network B). In an example, data traffic may flow from a port 102 of Network A to a port 104 of Network B. Both port 102 and port 104 may be RJ45 jacks that support Ethernet-over-twisted pairs.

In a 10/100 megabytes network environment, the direction of the data traffic is usually known and uni-directional. In an example, twisted pair pins 1-2 of port 102 and twisted pair pins 1'-2' of port 104 may be designated as the transmitting pairs while twisted pair pins 3-6 of port 102 and twisted pair pins 3'-6' of port 104 may be designated as the receiving pairs. For example, data traffic may flow from twisted pair pins 1-2 of port 102 along paths 108/110 to twisted pair pins 3'-6' of port 104. Similarly, data traffic coming in from port 104 may flow from twisted pair pins 1'-2' along paths 112/114 to twisted pair pins 3-6.

Since the directional flow of the data traffic within the network environment is known, a network tap 116 may be configured to tap into the paths (108/110 and 112/114) to monitor the data traffic flowing between the two network devices. In an example, data traffic flowing from port 102 to port 104 may be copied and sent along paths 120/122 to a set of physical layer interfaces (PHYs) 118 of network tap 116 before being forwarded to a monitoring device 128. Given that the flow of data traffic is predictable, network tap 116 may be a passive tap. In other words, network tap 116 is not required to be an inline tap. Accordingly, power loss to network tap 116 has substantially little impact on the data traffic (zero delay). In an example, latency and/or data loss may be substantially minimal. Discussion about zero delay on 10/100 megabytes tap is provided in a related application entitled "Zero-Interrupt Network Tap," filed Apr. 28, 2004 by Matityahu et al. (application Ser. No. 10/834,448), all of which are incorporated herein by reference.

Figure 2:
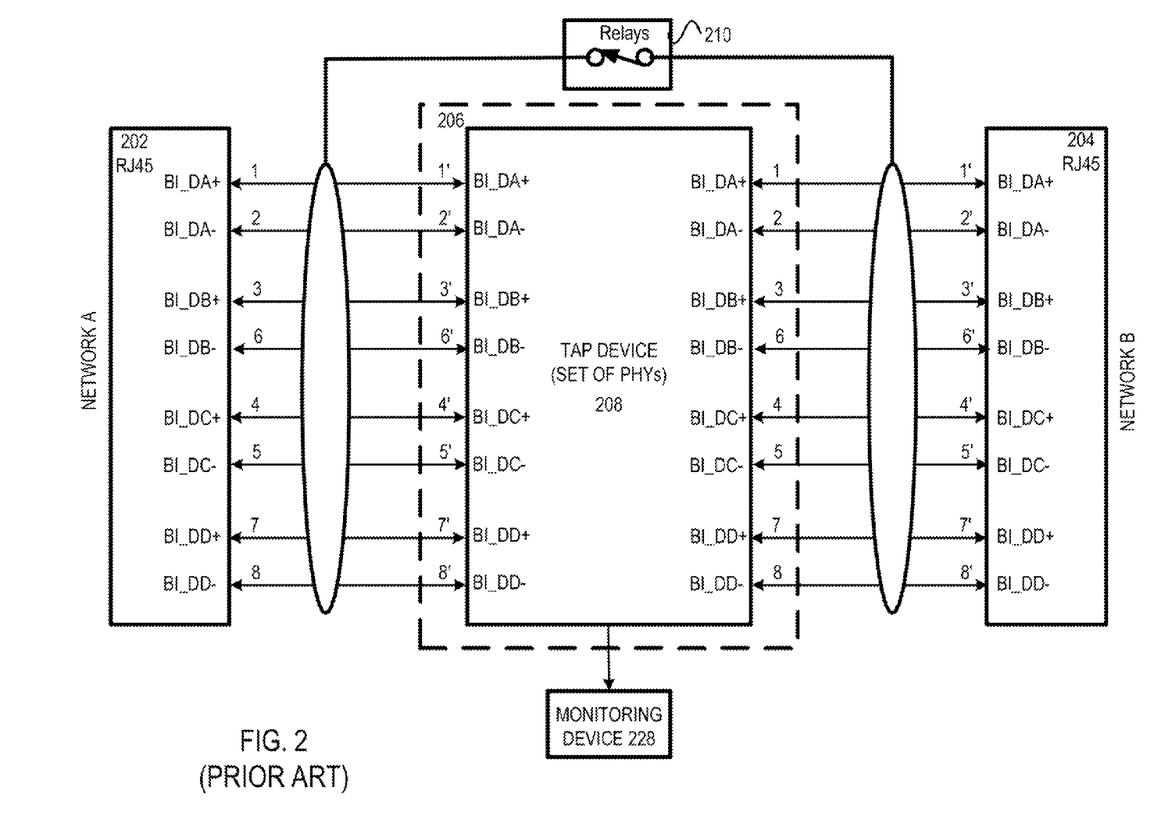
FIG. 2 shows a simple diagram of a network environment with a gigabit tap.

However, in a faster Ethernet environment, such as a gigabit Ethernet, the direction of the data traffic is usually bidirectional and unpredictable. To facilitate discussion, FIG. 2 shows a simple diagram of a network environment with a gigabit tap. Consider the situation wherein, for example, data traffic is flowing between a port 202 of Network A to a port 204 of Network B. Both port 202 and port 204 may be RJ45 jacks that support Ethernet over twisted pairs. To establish a communication link between the two ports, auto-negotiation may be performed. In auto-negotiation, the communication link may be established based on the fastest transmission mode available for the two network devices (such as Network A and Network B) based on common transmission parameters, such as speed of the link and configuration mode (e.g., half-duplex, full-duplex, and the like). Once a communication link is determined, data traffic may then be transmitted between the two network devices.

Given that the direction of the data traffic within a fast Ethernet environment may be unpredictable, an inline tap arrangement may be employed. With an inline tap arrangement, data traffic flowing between port 202 of Network A and port 204 of Network B is configured to flow through a network tap 206. Thus, instead of a communication link established between the two network devices, a communication link may be established between network tap 206 and each of the network devices. In other words, a communication link may be established between Network A and network tap 206 and between Network B and network tap 206. In an example, a network twisted pair pins 1-2 of port 202 may be configured to send data traffic to a tap twisted pair pins 3'-6' of PHY 208. Upon receiving the data traffic, PHY 208 may then forward the data traffic onward to Network B via a tap twisted pair pins 1-2 to a network twisted pair pins 3'-6' of port 204 while a copy of the data traffic may be forwarded to a monitoring device 228.

Since the network tap is an inline device, each time the network tap experiences a power disruption (either power is turn on or on the path between Network A and Network B may be renegotiated. In an example, network tap 206 is taken offline for maintenance. When the network tap is taken offline, a new communication link is negotiated to establish a path between Network A and Network B. In an example, a set of relays 210 may be triggered to establish a direct route from Network A to Network B (instead of going through network tap 206).

Each time network tap experiences power disruption, the communication link is lost and a new communication link may have to be established. Consider the situation wherein, for example, network tap 206 is turn off. Thus, the communication links between network tap 206 and Network A and Network B are broken. To enable data traffic to flow between the two network devices, a new communication link may be established. In other words, when the communication links are broken, a set of mechanical relays 210 may be triggered to create a new path. The time required to trigger set of mechanical relays 210 and to enable Network A and Network B to perform auto-negotiation may require a few milliseconds. The latency experienced during this time period may have dire financial consequences. In an example, in a financial industry, a latency of a few milliseconds can result in millions of dollars loss.

Accordingly, arrangements and methods for providing zero delay in a faster Ethernet environment (such as a gigabit Ethernet environment) are desirable.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

The invention is described with reference to specific architectures and protocols. Those skilled in the art will recognize that the description is for illustration and to provide examples of different mode of practicing the invention. The description is not meant to be limiting. For example, reference is made to network traffic and packets, while other forms of data and addresses can be used in the invention. The invention is applicable to both wire and optical technologies. The inventions also may include programmable logic for performing inline and/or span functions.

In accordance with embodiments of the present invention, a gigabits zero-delay tap is provided for enabling zero delay in a high-speed Ethernet environment (such as a gigabit Ethernet environment). Embodiments of the invention include arrangements and methods for monitoring the power supply to the gigabits zero-delay tap. Embodiments of the invention also include methods and arrangements for providing an alternative power supply to the gigabits zero-delay tap when power disruption occurs. Embodiments of the invention further include methods and arrangements for maintaining a communication link between the network devices.

In this document, various implementations may be discussed using network tap as an example. This invention, however, is not limited to network tap and may include any network and/or security appliances (e.g., routers, switches, hubs, bridges, load balancer, firewalls, packet shaper, and the like). Instead, the discussions are meant as examples and the invention is not limited by the examples presented.

As previously mentioned in a high-speed Ethernet environment, such as a gigabit Ethernet, the direction of the data traffic between network devices is usually bidirectional and unpredictable. To establish a communication link between the network devices, auto-negotiation may be performed to determine the fastest transmission mode between the network devices. Once a communication link is determined, data traffic may then be transmitted between the network devices.

A tap arrangement may be employed to control the data flow between the network devices. In other words, instead of a communication link established between the network devices, a communication link may be established between the tap and each of the network devices. However, each time the network tap experiences a power disruption, the path between the network devices may have to be renegotiated since the communication link is lost and a new communication link may have to be established. In an example, when the communication link is broken, a set of mechanical relays may be triggered to create a new path. Unfortunately, a few milliseconds may be required to trigger a set of mechanical relays and to perform auto-negotiation. These few milliseconds may create latency that may have dire financial consequences in a time sensitive environment, such as the financial industry where latency of a few milliseconds can result in millions of dollars loss.

In an embodiment of the invention, a gigabits zero-delay tap is provided. Even though the invention may be described using an inline tap example, the invention is not limited to an inline device and may include programmable logic for performing inline and/or span functions. In an embodiment, the tap may include a primary and an alternative power source. The primary source may be configured to provide the daily power source to the tap. However, when the primary power source is not working properly, an alternative power source may be triggered to prevent power disruption to the tap, thereby minimizing the possibility of latency.

In an embodiment, the gigabits zero-delay tap may include a sensor controller, which may be configured to monitor the power flowing into the tap. In an embodiment, the sensor controller may also be configured to monitor the alternative power source. In an example, if the power level for the alternative power source is low, a portion of the power flowing from the primary power source may be diverted and employed to charge the alternative power source.

In an embodiment, the sensor controller may be configured to compare the power flowing into the tap against a predefined threshold. If the power level is below a predefined threshold, then the alternative power source may be activated. In activating an alternative power source, the sensor controller may close a set of relays to create an alternative path (alternative communication link) between the network devices. Since some time may be required for the set of relays to establish the alternative path, in an embodiment of the invention, a set of capacitors may be employed to provide a temporary source of power to the network tap in order to maintain the current communication link.

Since the alternative power source is activated when the power drop is first detected and the communication link between the network devices has not yet been broken, no data packet loss is experienced. By monitoring the power level, an alternative power source may be provided to enable the data traffic to continue to flow through the network with no data packet loss. The cost of implementing an alternative power path is relatively inexpensive but may provide a company with sufficient time to perform maintenance.

If an alternative power source is not available to maintain the relationship between the network tap and the network devices, the communication link between the network devices may still be maintained such that a loss of data packets is minimized. Similar to above, a set of capacitors may be employed to provide the temporary power source to the tap to maintain the current communication link while a set of relays is establishing a direct communication path between the network devices. Even though the network tap is no longer able to monitor the data traffic flowing through the network, a communication link between the network devices is still maintained and latency is minimized. Thus, disruption to a company's network traffic may be substantially minimized, thereby, enabling the company to maintain its quality of service and limit its financial loss.

The features and advantages of the present invention may be better understood with reference to the figures and discussions that follow.

Figure 3:
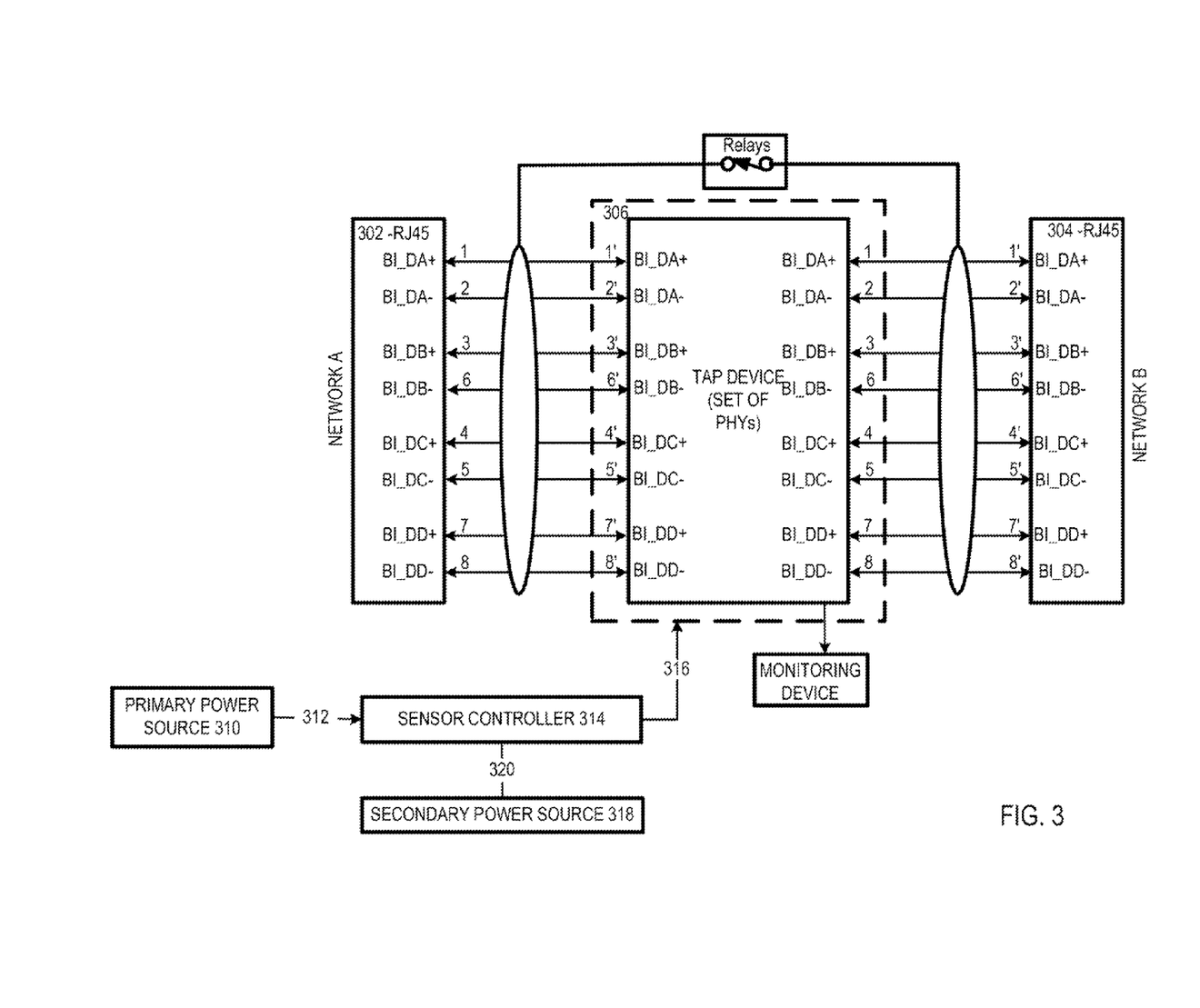
FIG. 3 shows, in an embodiment of the invention, a simple block diagram illustrating an arrangement for an alternative power source for a network tap in a fast Ethernet environment.

FIG. 3 shows, in an embodiment of the invention, a simple block diagram illustrating an arrangement for an alternative power source for a network tap in a fast Ethernet environment (high-speed). Consider the situation wherein, for example, data traffic is flowing between two network devices, between a port 302 of Network A and a port 304 of Network B. Both port 302 and port 304 may be RJ45 jacks that support Ethernet over twisted pairs. To monitor the data traffic, a gigabit network tap 306 may be provided. As aforementioned, in order for network tap 306 to monitor the data traffic, a communication link may be established between network tap 306 and port 302 of Network A and network tap 306 and port 304 of Network B.

Network tap 306 may be powered by an external power source, such as a primary power source 310 (e.g., 12 volt power adaptor). In an embodiment of the invention, a sensor controller 314 may be employed to monitor the power flowing from a path 312 into network tap 306 (via a path 316). In an embodiment, sensor controller 314 may also be configured to monitor a secondary power source 318 (such as a 12 volt battery). If the power level for secondary power source 318 is low (e.g., below a predefined threshold), sensor controller 314 may divert a portion of the power flowing from primary power source 310 to charge secondary power source 318 (via a path 320).

In an embodiment, if sensor controller 314 senses a power drop, sensor controller 314 may activate secondary power source 318. In an example, power to network tap 306 is turn off. In an embodiment, sensor controller 314 may be configured to compare power flowing from primary power source 310 against a predefined threshold. If the power coming from primary power source 310 falls below a predefined threshold, sensor controller may be configured to activate secondary power source 318 to provide an alternate source of power to network tap 306. Given that secondary power source 318 is activated when a power drop is first detected, the communication links that may be established to enable data traffic to flow through network tap 306 may be maintained.

Figure 4:
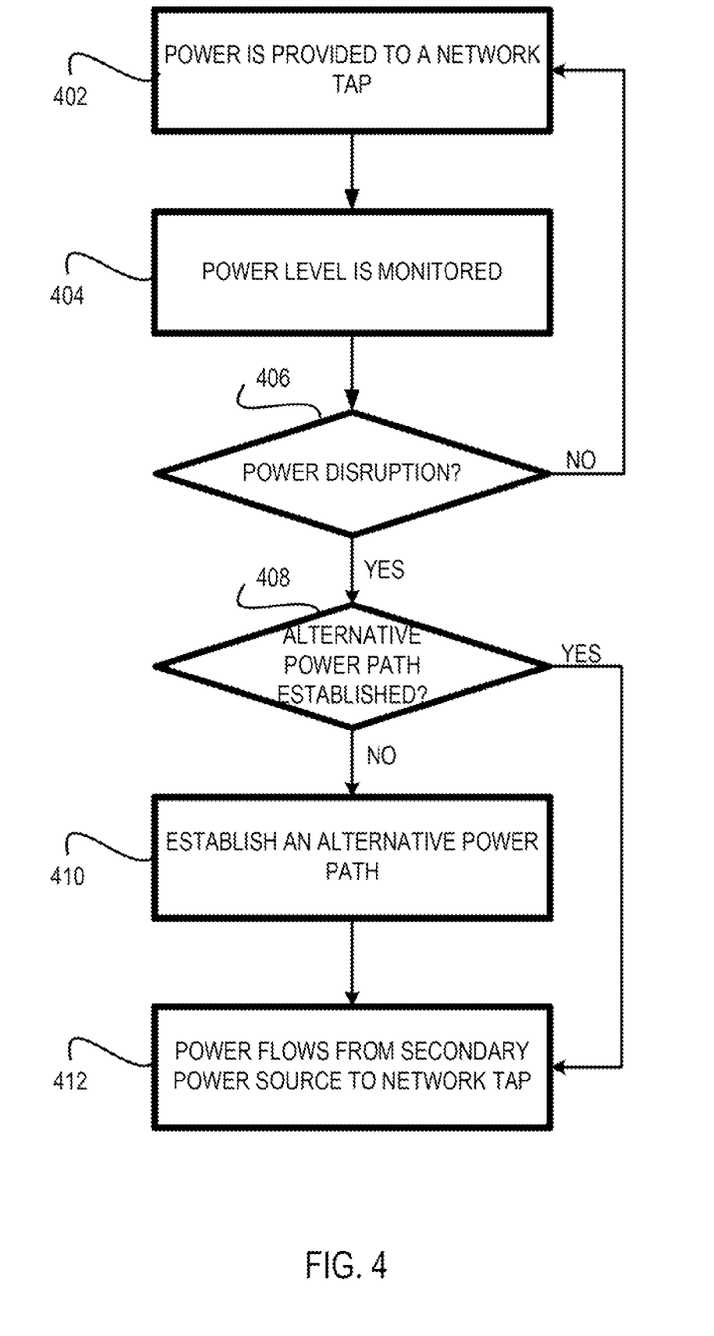
FIG. 4 shows, in an embodiment of the invention, a simple flow chart illustrating steps for implementing an alternative power source arrangement.

FIG. 4 shows, in an embodiment of the invention, a simple flow chart illustrating steps for implementing an alternative power source arrangement.

At a first step 402, power is provided to a network tap, which is configured to monitor data traffic flowing between two network devices. In an example, primary power source 310 is turned on.

At a next step 404, power level is monitored by a sensor controller. In an example, sensor controller 314 may be monitoring the power level flowing from primary power source 310 to network tap 306. In an embodiment, sensor controller 314 may also be monitoring the power level of secondary power source 318. If secondary power source 318 is low, part of power flowing from primary power source 310 is diverted to charge secondary power source 318.

At a next step 406, the sensor controller determines if a power disruption has occurred. In an example, sensor controller 314 may be comparing the power level flowing from primary power source 310 against a predefined threshold. If the power level is above the predefined threshold, power continues to flow from primary power source (step 402).

However, if the power level is below the predefined threshold, the sensor controller may then make a determination if an alternative power path has already been established (step 408). In an example, if power is currently flowing from primary power source 310, then an alternative power path is not currently established. Thus, when sensor controller 314 makes a determination that a power drop has occurred, an alternative power path may be established (step 410) and power begins to flow from secondary power source 318 (step 412). In other words, sensor controller 314 may activate secondary power source 318 to provide power to network tap 306. Thus, power is provided to network tap 306 to enable the communication links to be maintained and network tap 306 to continue monitoring the data traffic flowing through the network.

However, if an alternative power path has already been established, then power continues to flow from secondary power source 318 (step 412).

As can be appreciated from FIGS. 3 and 4, an arrangement and methods are provided for determining when power disruption may occur. By monitoring the power level, an alternative power source may be provided to enable the data traffic to continue to flow through the network with no data packet loss. The cost of implementing an alternative power path is relatively inexpensive but may provide the company sufficient time (about 4-5 hours depending upon the capability of the secondary power source) to perform maintenance and prevent data loss.

Figure 5A:
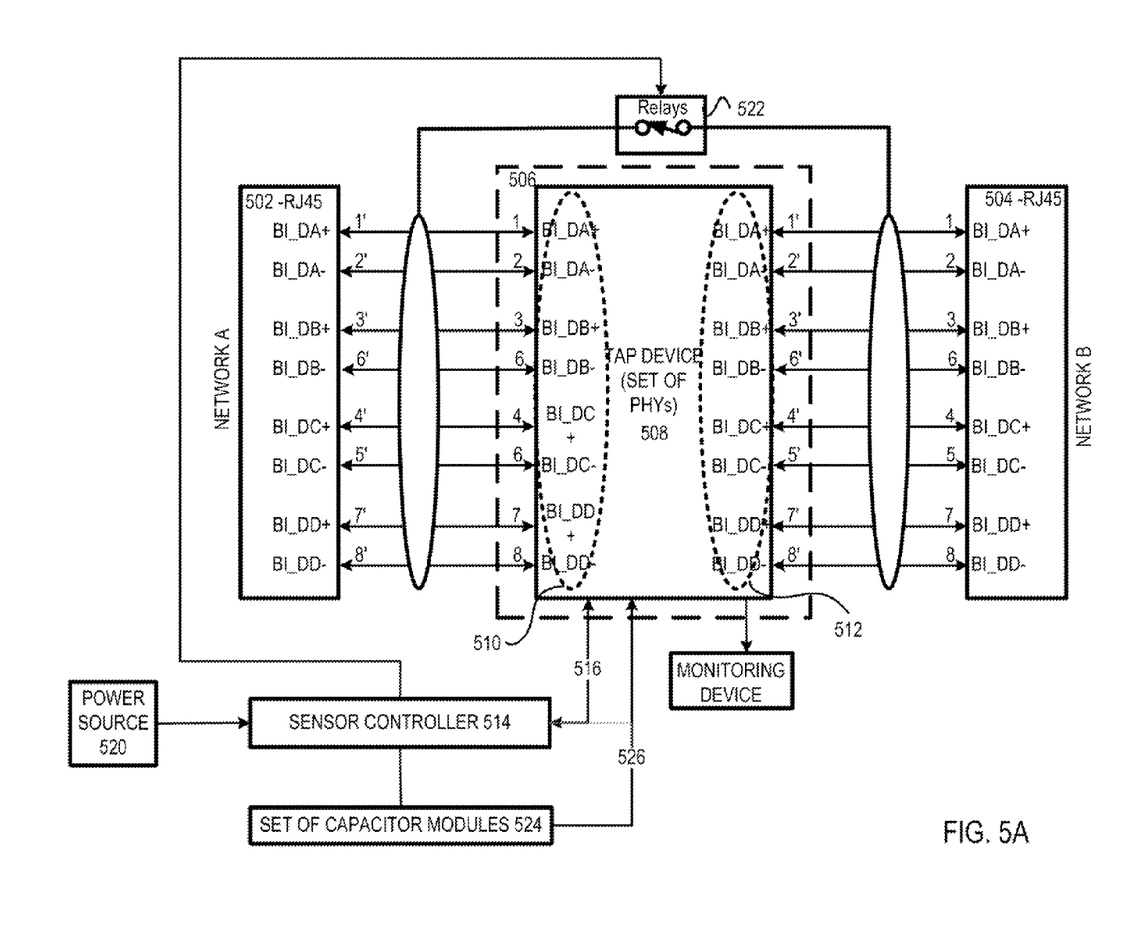
FIG. 5A shows, in an embodiment of the invention, a simple block diagram illustrating an arrangement for maintaining a link after a power disruption.

FIG. 5A shows, in an embodiment of the invention, a simple block diagram illustrating an arrangement for maintaining a link after a power disruption. Consider the situation wherein, for example, data traffic is flowing between two network devices, between a port 502 of Network A and a port 504 of Network B. Both port 502 and port 504 may be RJ45 jacks that support Ethernet over twisted pairs. To monitor the data traffic, a gigabit network tap 506 may be provided. As aforementioned, in order for network tap 506 to monitor the data traffic, a communication link may be established between network tap 506 and port 502 of Network A and network tap 506 and port 504 of Network B.

Those skilled in the art are aware that a gigabit network tap may include a set of PHYs for establishing communication links with the network devices. In an embodiment, when network tap 506 is first turn on, the master-slave mode of a set of PHYs 508 may be configured. In an embodiment, a sensor controller 514 may be employed to configure set of PHYs 508 via a path 516. In an example, side 510 of set of PHYs 508 may be set up in a master mode while side 512 of set of PHYs 508 may be set up in a slave mode. Once the master-slave mode has been established, network tap 506 may participate in auto-negotiation to establish a communication link with each of the network devices.

Since side 510 of set of PHYs has been set up in a master mode, port 502 of Network A may be set up in a slave mode. Likewise, since side 512 of set of PHYs has been set up in a slave mode, port 504 of Network B may be set up in a master mode. In an example, data traffic may flow from network twisted pair pins 1-2 of port 504 to tap twisted pair pins 3'-6' of side 512 of set of PHYs. The data traffic is then forwarded by tap twisted pair pins 1-2 of side 510 of set of PHYs 504 to network twisted pair pins 3'-6' side of port 502. In another example, data traffic may flow from network twisted pair pins 4-5 of port 504 to tap twisted pair pins 7'-8' of side 512 of set of PHYs. The data traffic is then forwarded by tap twisted pair pins 4-5 of side 510 of set of PHYs 504 to network twisted pair pins 7'-8' side of port 502.

In an embodiment, sensor controller 514 may also be configured to monitor the power level flowing to network tap 506. In an example, a primary power source 520 (such as a 12 volt power adaptor) may be available to provide power to network tap 506. Similar to FIG. 3, sensor controller 514 may be configured to compare the power level from primary power source 520 to a predefined threshold. If the power level falls below the predefined threshold, then sensor controller may switch a set of relays 522 from an opened position to a close position to create an alternative data path.

Figure 5B:
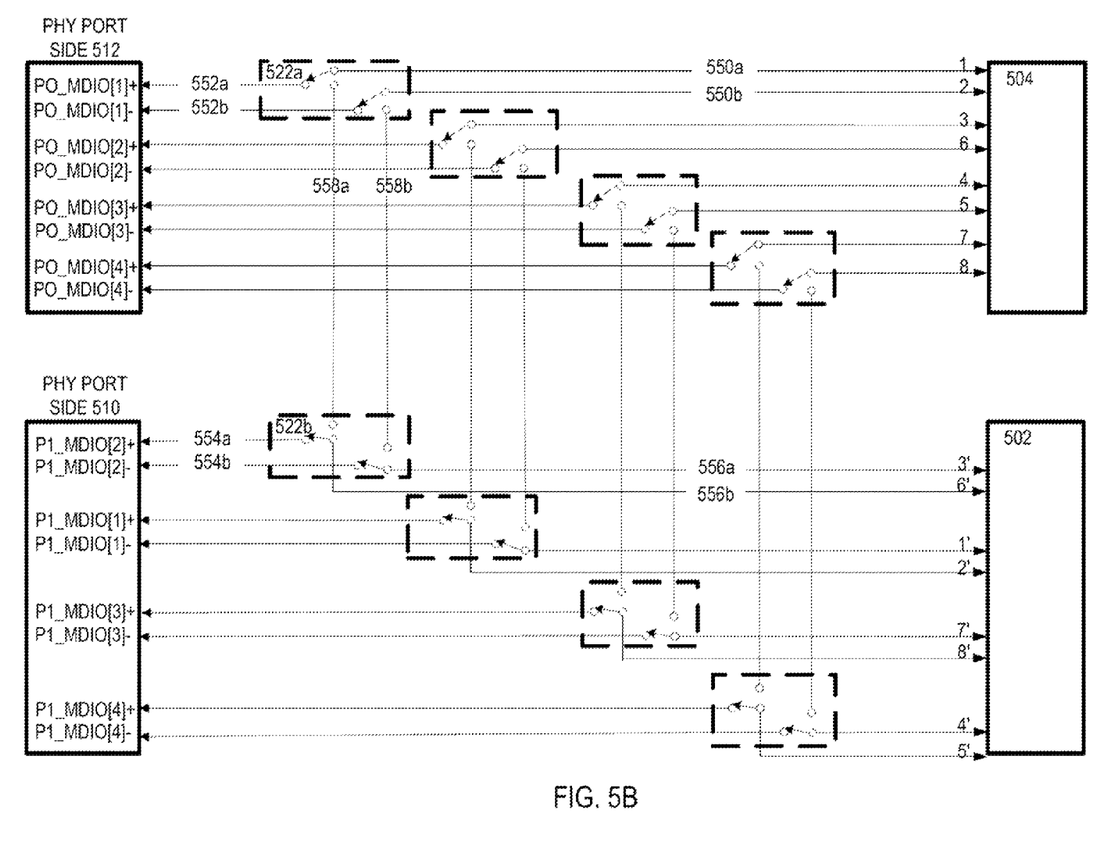
FIG. 5B shows, in an embodiment, examples of data paths between two network devices.

FIG. 5B shows, in an embodiment, examples of data paths between two network devices. In an example, data traffic may be flowing from port 504 (network twisted pair pins 1-2) through network tap 506 to port 502 (network twisted pair pins 3'-6'). In other words, data traffic may flow from network twisted pair pins 1-2 of port 504 through a relay 522a (paths 550a/550b) to tap twisted pair pins 3'-6' of side 512 of set of PHYs (paths 552a/552b). The data traffic is then forwarded by tap twisted pair pins 1-2 of side 510 of set of PHYs 504 through a relay 522b (paths 554a/554b) to network twisted pair pins 3'-6' side of port 502 (paths 556a/556b). However, when power disruption occurs, relay 522 may be switched to establish a set of alternative paths. In an example, instead of flowing through paths 552a/552b and paths 554a/554b, data traffic may be directed from relay 522a along paths 558a/558b to relay 522b (without going through network tap 506) before flowing onward to port 504 of Network B.

In an embodiment, auto-negotiation is not required to establish a new communication link. Since port 502 of Network A has been previously set up in a slave mode, for example, and port 504 of Network B has been previously set up in a master mode, for example, auto-negotiation is not required to set up a new communication link since the master-slave mode has already been defined and has not changed.

In the prior art, the set of relays may be activated to establish a new path after power has been loss. As a result, renegotiation is usually required to set up an alternative path between Network A and Network B. Unlike the prior art, the set of relays is activate by sensor controller 514 before the power disruption causes a power drop that is unable to maintain the current communication link, in an embodiment. In other words, the set of relays may be activated before all power has been lost. By creating an alternate path prior to loss of all power, an alternative path may be established while minimizing data loss. In an embodiment, a set of capacitor modules 524 may be employed to store a power source to provide sufficient power to network tap 506 (via a path 526) to maintain the current communication links while set of relays 522 is setting up an alternative path. In an embodiment, since the master-slave mode has already been established, auto-renegotiation is not necessary to establish a new communication link between the network devices.

In an embodiment, the set of relays is a modular component and may be removable. In an example, the set of relays may be connected to a set of PHYs via a set of sockets. Thus, the set of relays may be quickly connected and disconnected for maintenance.

Figure 6A:
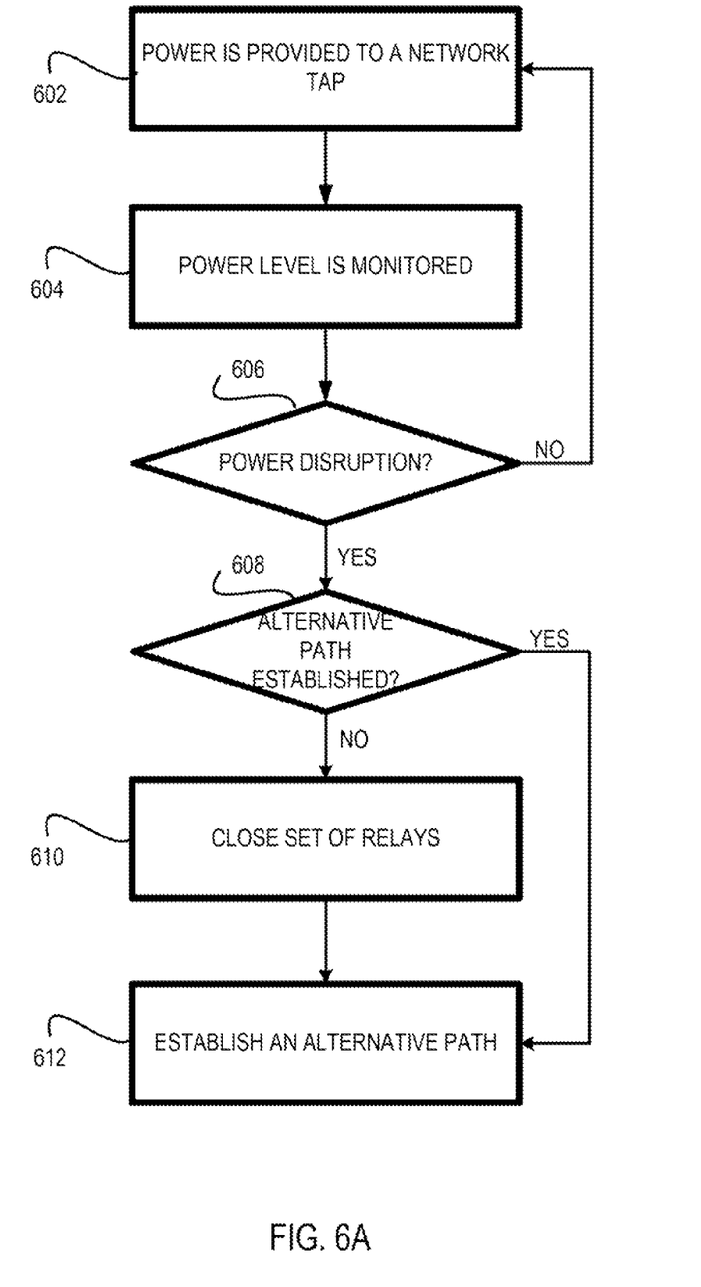
FIG. 6A shows, in an embodiment of the invention, a simple flow chart illustrating a method for maintaining a link after a power disruption in the primary power source has occurred.

FIG. 6A shows, in an embodiment of the invention, a simple flow chart illustrating a method for maintaining a link after a power disruption in the primary power source has occurred.

At a first step 602, power is provided to a network tap, which is configured to monitor data traffic flowing between two network devices. In an example, primary power source 520 is turned on.

At a next step 604, power level is monitored by a sensor controller. In an example, sensor controller 514 may be monitoring the power level flowing from primary power source 520 to network tap 506.

At a next step 606, the sensor controller determines if a power disruption has occurred. In an example, sensor controller 514 may be comparing the power level flowing from primary power source 520 against a predefined threshold. If the power level is above the predefined threshold, power continues to flow from primary power source (step 602).

However, if the power level is below the predefined threshold, the sensor controller may make a determination if an alternative path has already been established (step 608). In an example, if power is currently being flowing from primary power source 520, then an alternative path is not currently established. Thus, when sensor controller 514 makes a determination that a power drop has occurred, sensor controller 514 may close a set of relays to create an alternative path (step 610). In an embodiment of the invention, a set of capacitors may be available to provide a source of temporary power to network tap 506 in order to maintain the current communication link in order to provide set of relays 522 sufficient time to establish an alternative path for data traffic to flow between Network A and Network B (step 612).

However, if an alternative path has already been established, then the data traffic continues to flow through the alternative path (step 612).

Figure 6B:
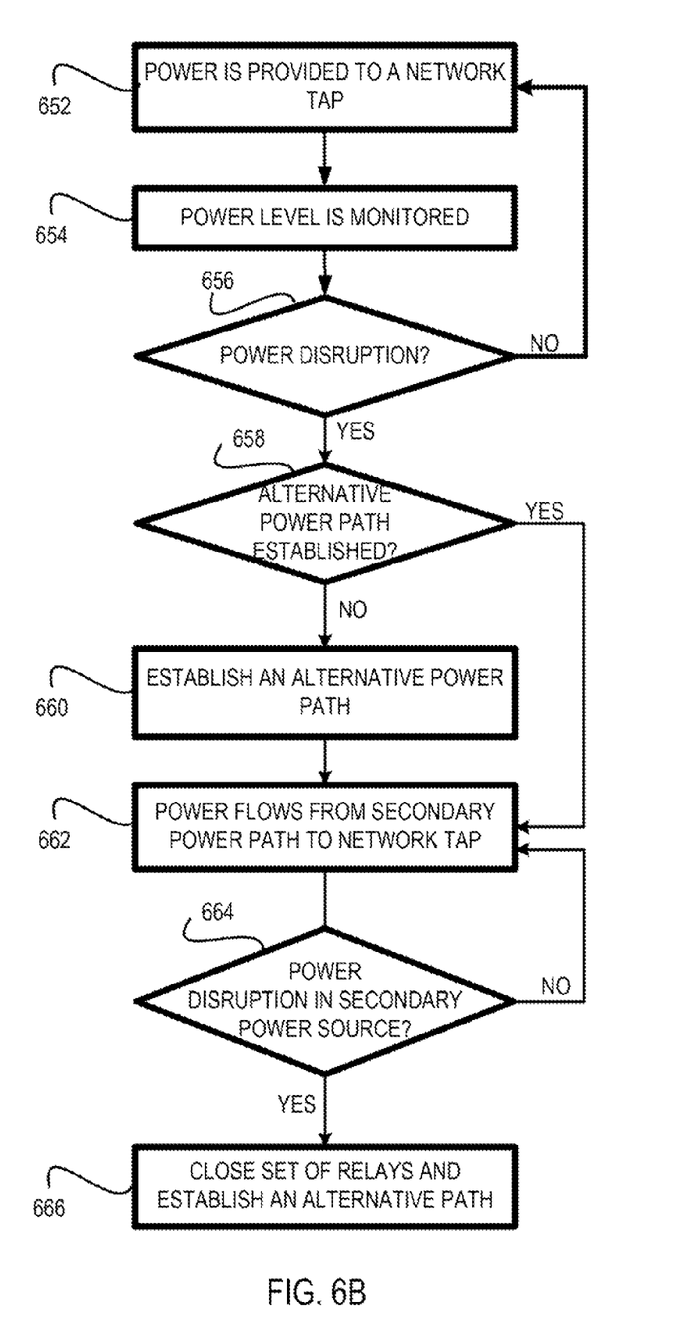
FIG. 6B shows, in an embodiment of the invention, a simple flow chart illustrating a method for maintaining a link when no power source is available to provide power to a network tap.

FIG. 6B shows, in an embodiment of the invention, a simple flow chart illustrating a method for maintaining a link when no power source is available to provide power to a network tap.

At a first step 652, power is provided to a network tap, which is configured to monitor data traffic flowing between two network devices. In an example, primary power source 520 is turned on.

At a next step 654, power level is monitored by a sensor controller. In an example, sensor controller 514 may be monitoring the power level flowing from primary power source 520 to network tap 506. In an embodiment, sensor controller 514 may also be monitoring the power level of a secondary power source (such as a 12 volt battery). If the secondary power source is low, part of power flowing from primary power source 520 is diverted to charge the secondary power source.

At a next step 656, the sensor controller determines if a power disruption has occurred. In an example, sensor controller 514 may be comparing the power level flowing from primary power source 520 against a predefined threshold. If the power level is above the predefined threshold, power continues to flow from primary power source (step 652).

However, if the power level is below the predefined threshold, the sensor controller may then make a determination if an alternative power path has already been established (step 658) In an example, if power is currently flowing from primary power source 520, then an alternative power path is not currently established. Thus, when sensor controller 514 makes a determination that a power drop has occurred, an alternative power path may be established (step 660) and power begins to (low from the secondary power source (step 662). In other words, sensor controller 514 may activate the secondary power source to provide power to network tap 506. Thus, power is provided to network tap to enable the communication links to be maintained and network tap 506 to continue monitoring the data traffic flowing through the network.

However, if an alternative power path has already been established, then power continues to flow from the secondary power source (step 662).

At a next step 664, the sensor controller may make a determination if sufficient power from the secondary power source is available to support the network tap. If the power level is above a predefined threshold, then power continues to flow from the secondary power source (step 662).

However, if both the primary and secondary power sources are not available, then at a next step 666, sensor controller 514 may close a set of relays to create an alternative path. In an embodiment of the invention, a set of capacitors may be available to provide a source of temporary power to network tap 506 in order to maintain the current communication link in order to provide set of relays 522 sufficient time to establish an alternative path for data traffic to flow between Network A and Network B. In other words, when both power sources are not available, the set of relays may create a direct communication link between the two network devices. Since a master-slave relationship has already been established, no auto-negotiation is required to set up the new path.

As can be appreciated from FIGS. 5 and 6A-6B, an arrangement and methods are provided for maintaining a link when power disruption may occur causing the network tap to go offline. By monitoring the power level, an alternative path may be established to maintain the link between two network devices. Thus, even though the network tap may no longer be available to monitor the data traffic, an alternative data path may be established. As a result, financial losses that may be experienced due to latency delay may be minimized.

Figure 7:
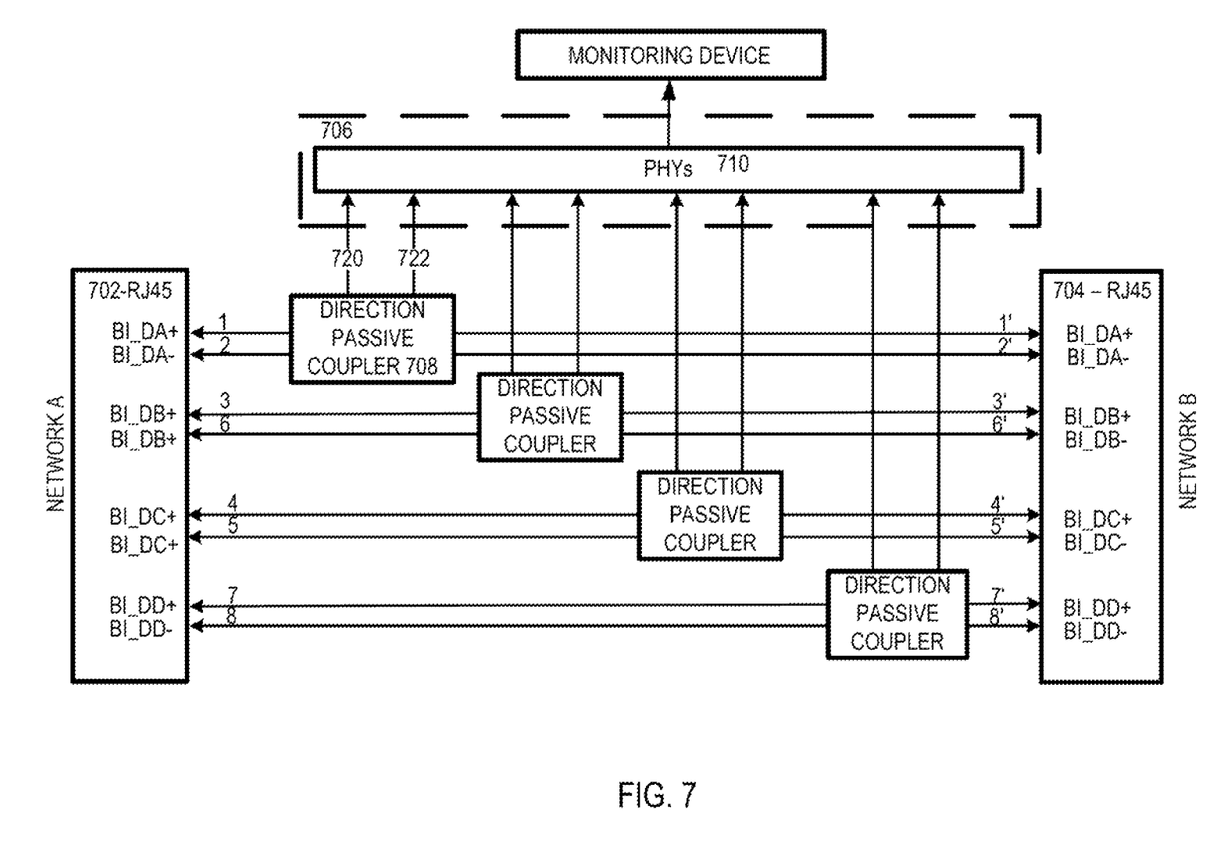
FIG. 7 shows, in an embodiment of the invention, a simple block diagram illustrating an arrangement for maintaining zero delay within a fast Ethernet environment.

FIG. 7 shows, in an embodiment of the invention, a simple block diagram illustrating an arrangement for maintaining zero delay within a fast Ethernet environment. Consider the situation wherein, for example, data traffic is flowing between two network devices, between a port 702 of Network A and a port 704 of Network B. Both port 702 and port 704 may be RJ45 jacks that support Ethernet over twisted pairs. To monitor the data traffic, a gigabit network tap 706 may be provided.

In an embodiment, a set of PHYs 710 may be configured to assign data traffic flowing from each specific twisted pair pins along a designated data path. In an embodiment, a set of direction passive couplers 708 may be employed to direct traffic to network tap 706 along the designated data paths. Set of direction passive couplers 708 may be configured to at least receive a copy of the data traffic, determine the direction of the data traffic and route the data traffic through a designated path. In an example, data traffic flowing from twisted pair pins 1-2 of port 702 may be directed by set of direction passive couplers 708 along a path 720. In another example, data traffic flowing from twisted pair pins 1'-2' of port 704 may be directed by set of direction passive couplers 708 along a path 722. Since data traffic is flowing into set of PHYs 710 along a designated path, set of PHYs 710 is able to route the data traffic onward to one or more monitoring devices.

As can be appreciated from FIG. 7, an arrangement is provided for providing zero delay in a faster Ethernet environment. Given that the inline set of direction passive couplers is passive and does not require power, the possibility of auto-negotiation due to power disruption is substantially eliminated. Thus, even if the network tap suffers power disruption, the power situation of the network tap does not affect the communication link between Network A and Network B.

As can be appreciated from the foregoing, arrangements and methods are provided for maintaining a communication link between two network devices with minimal or even zero delay. By providing a secondary power source, an alternative power source may be provided to maintain the communication link between the two network devices and a network tap. With a temporary power source through a set of capacitors, the loss of power to the network tap may be temporarily delay to provide a new alternative path to be established while still maintaining the current communication link. Thus, disruption to a company's network traffic may be substantially minimized, thereby, enabling the company to maintain its quality of service and limit its financial loss.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A gigabits zero-delay arrangement for enabling continuous monitoring of data traversing through a network in a high-speed Ethernet environment, comprising:
   a high-speed network device configured for monitoring said data flowing through said network wherein said high-speed network device is a gigabits network tap;
   an external primary power source for providing a first power to circuitry of said high-speed network device of said gigabits zero-delay arrangement; and a sensor controller configured for monitoring power flowing into said high-speed network device and for establishing an alternative communication link, said sensor controller is configured for establishing said alternative communication link when said first power of said external primary power source is below a predefined threshold.

2. The arrangement of claim 1 wherein said sensor controller is configured for
activating a set of capacitor modules to provide temporary power to said gigabits network tap when said first power is below said predefined threshold, and
switching a set of relays from an opened position to a close position to establish said alternative communication link.

3. The arrangement of claim 2 wherein said gigabits network tap includes a set of physical layer interfaces (PHYs) configured for establishing communication links with at least one network device.

4. The arrangement of claim 3 wherein a master-slave relationship is established between said gigabits network tap and said network device to control the direction of network traffic flowing between said gigabits network tap and said network device.

5. The arrangement of claim 1 further including a secondary power source for providing a secondary power to said high-speed network device when said primary power source is not available.

6. The arrangement of claim 5 wherein said sensor controller is configured for monitoring said secondary power source, wherein a portion of said first power flowing from said primary power source is diverted to said secondary power source if power level of said secondary power source is below a predefined threshold, 7. The arrangement of claim 5 wherein said secondary power source is a battery.

8. The arrangement of claim 5 wherein said sensor controller is configured for activating said secondary power source when said first power of said primary power source is below a predefined threshold.

9. The arrangement of claim 8 wherein said sensor controller is configured for
activating a set of capacitor modules to provide temporary power to said high-speed network device when said first power is below said predefined threshold, and
switching a set of relays from an opened position to a close position to activate said secondary power source.

10. A method for establishing an alternative communication link between network devices in a high-speed Ethernet environment, comprising:
monitoring a first power flowing from an external primary power source to a high-speed network device, wherein said high-speed network device is a gigabits zero-delay tap;
comparing a power level of said first power against a predefined threshold; and
if said power level is below said predefined threshold, establishing said alternative communication link before said first power is unable to maintain current communication link.

11. The method of claim 10 further including activating a secondary power source in establishing said alternative communication link.

12. The method of claim 11 wherein said secondary power source is a battery.

13. The method of claim 11 wherein said establishing of said alternative communication link includes
activating a set of capacitor modules to provide temporary power to said high-speed network device when said first power is below said predefined threshold, and
switching a set of relays from an opened position to a close position to establish said alternative communication link.

14. The method of claim 10 wherein said establishing of said alternative communication link includes
activating a set of capacitor modules to provide temporary power to said high-speed network device when said first power is below said predefined threshold, and
switching a set of relays from an opened position to a close position to establish said alternative communication link.

15. The method of claim 10 further including employing a set of physical layer interfaces (PHYs) to establish a communication link between said network devices.

16. The method of claim 15 wherein said communication link is established by creating a master-slave relationship, wherein said master-slave relationship is established to control the direction of network traffic flowing between said high-speed network device and said network devices.

17. A gigabits zero-delay arrangement for enabling continuous monitoring of data traversing through a network in a high-speed Ethernet environment, comprising:
a high-speed network device configured for monitoring said data flowing through said network;
a primary power source for providing a first power to circuitry of said gigabits zero-delay arrangement; and
a set of direction passive couplers configured for directing network traffic to said high-speed network device, wherein said set of direction passive couplers is configured for
receiving a copy of said network traffic,
determining the direction of said network traffic, and
routing said network traffic along a designated path.

* * * * *